US011501786B2

(12) United States Patent
Gish et al.

(10) Patent No.: US 11,501,786 B2
(45) Date of Patent: Nov. 15, 2022

(54) METHODS AND APPARATUS FOR SUPPLEMENTING PARTIALLY READABLE AND/OR INACCURATE CODES IN MEDIA

(71) Applicant: The Nielsen Company (US), LLC, New York, NY (US)

(72) Inventors: David Gish, Riverdale, NJ (US); Jeremey M. Davis, New Port Richey, FL (US); Wendell D. Lynch, East Lansing, MI (US); Christen V. Nielsen, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 16/862,917

(22) Filed: Apr. 30, 2020

(65) Prior Publication Data
US 2021/0343297 A1    Nov. 4, 2021

(51) Int. Cl.
*G10L 19/018* (2013.01)
*G10L 19/02* (2013.01)
*G10L 25/51* (2013.01)

(52) U.S. Cl.
CPC ........ *G10L 19/018* (2013.01); *G10L 19/0204* (2013.01); *G10L 25/51* (2013.01)

(58) Field of Classification Search
CPC .................................................. G10L 19/018
See application file for complete search history.

(56) References Cited

U.S. PATENT DOCUMENTS

| 5,425,100 | A  | 6/1995  | Thomas et al. |
| 5,481,294 | A  | 1/1996  | Thomas et al. |
| 5,606,609 | A  | 2/1997  | Houser et al. |
| 6,154,571 | A  | 11/2000 | Cox et al. |
| 7,457,962 | B2 | 11/2008 | Moskowitz |
| 7,978,859 | B2 | 7/2011  | Conrado et al. |
| 8,023,691 | B2 | 9/2011  | Rodriguez et al. |

(Continued)

FOREIGN PATENT DOCUMENTS

| EP | 1190386 | 3/2002 |
| EP | 2211301 | 7/2010 |

(Continued)

OTHER PUBLICATIONS

International Searching Authority, "International Search Report and Written Opinion" issued in connection with Application No. PCT/US2013/059497, dated Dec. 19, 2013, 13 pages.

(Continued)

*Primary Examiner* — Bryan S Blankenagel
(74) *Attorney, Agent, or Firm* — Hanley, Flight & Zimmerman, LLC

(57) ABSTRACT

Methods and apparatus are disclosed for supplementing partially readable and/or inaccurate codes. An example apparatus includes a watermark analyzer to select a first watermark and a second watermark decoded from media; a comparator to compare a first decoded timestamp of the first watermark to a second decoded timestamp of the second watermark; and a timestamp adjuster to adjust the second decoded timestamp based on the first decoded timestamp of the second watermark when at least a threshold number of symbols of the second decoded timestamp match corresponding symbols of the first decoded timestamp.

29 Claims, 7 Drawing Sheets

(56) References Cited

U.S. PATENT DOCUMENTS

| | | | |
|---|---|---|---|
| 9,286,912 B2 | 3/2016 | Srinivasan et al. | |
| 10,129,575 B1* | 11/2018 | Wang | H04N 21/2407 |
| 2002/0059580 A1 | 5/2002 | Kalker et al. | |
| 2002/0168082 A1 | 11/2002 | Razdan | |
| 2003/0152225 A1* | 8/2003 | Kunisa | G06T 1/005 |
| | | | 380/210 |
| 2004/0009763 A1 | 1/2004 | Stone et al. | |
| 2004/0210922 A1 | 10/2004 | Peiffer et al. | |
| 2005/0180567 A1* | 8/2005 | Williams | H04N 7/163 |
| | | | 380/201 |
| 2007/0055987 A1 | 3/2007 | Lu et al. | |
| 2007/0168409 A1 | 7/2007 | Cheung | |
| 2008/0168409 A1 | 7/2008 | Chiu et al. | |
| 2008/0208851 A1 | 8/2008 | Briggs et al. | |
| 2009/0049465 A1 | 2/2009 | Deng | |
| 2009/0070797 A1 | 3/2009 | Ramaswamy et al. | |
| 2009/0070850 A1 | 3/2009 | Lee | |
| 2009/0185074 A1* | 7/2009 | Streijl | H04N 21/435 |
| | | | 348/468 |
| 2009/0287662 A1 | 11/2009 | Robson et al. | |
| 2010/0119208 A1 | 5/2010 | Davis et al. | |
| 2010/0226526 A1 | 9/2010 | Modro et al. | |
| 2014/0088742 A1* | 3/2014 | Srinivasan | H04H 60/372 |
| | | | 700/94 |
| 2017/0372445 A1* | 12/2017 | Nielsen | G06Q 30/0201 |
| 2020/0374810 A1* | 11/2020 | Hart | H04W 52/245 |

FOREIGN PATENT DOCUMENTS

| | | |
|---|---|---|
| JP | 2000505618 | 5/2000 |
| JP | 2004505496 | 2/2004 |
| WO | 9512278 | 5/1995 |
| WO | 9731440 | 8/1997 |
| WO | 0175794 | 10/2001 |
| WO | 0209328 | 1/2002 |
| WO | 03060630 | 7/2003 |
| WO | 2005049940 | 6/2005 |
| WO | 2010054222 | 5/2010 |

OTHER PUBLICATIONS

IP Australia, "Examination Report," issued in connection with Australian Application No. 2013324105, dated Apr. 21, 2015, 3 pages.

United States Patent and Trademark Office, "Non-Final Office Action," issued in connection with U.S. Appl. No. 13/627,495, dated Jun. 4, 2015, 19 pages.

United States Patent and Trademark Office, "Notice of Allowance and Fee(s) Due," issued in connection with U.S. Appl. No. 13/627,495, dated Oct. 30, 2015, 10 pages.

IP Australia, "Notice of Acceptance," issued in connection with Australian Application No. 2013324105, dated Apr. 29, 2016, 2 pages.

Canadian Intellectual Property Office, "Examiner Report" issued in connection with Canadian Application No. 2,875,289, dated Feb. 12, 2016, 3 pages.

Canadian Intellectual Property Office, "Notice of Allowance," issued in connection with Canadian Application No. 2,875,289, dated Feb. 7, 2017, 1 page.

State Intellectual Property Office of China, "First Office Action," issued in connection with Chinese Application No. 201380029269.6, dated Feb. 13, 2017, 12 pages.

State Intellectual Property Office of China, "Notice of Completion," issued in connection with Chinese Application No. 201380029269.6, dated Oct. 24, 2017, 5 pages.

European Patent Office, "European Search Report," issued in connection with European Application No. 13842609.3, dated Jul. 12, 2016, 10 pages.

European Patent Office, "Communication pursuant to Article 94(3) EPC," issued in connection with European Application No. 13842609.3, dated Mar. 18, 2019, 9 pages.

European Patent Office, "Communication pursuant to Article 94(3) EPC," issued in connection with European Application No. 13842609.3, dated Dec. 6, 2019, 7 pages.

Intellectual Property India, "Examination Report," issued in connection with Indian Application No. 10101/DELNP/2014, dated Jan. 2, 2019, 5 pages.

Japanese Patent Office, "Notice of Reasons for Rejection," issued in connection with Japanese Application No. P2015-525648, dated Jan. 5, 2016, 14 pages.

Japanese Patent Office, "Decision to Grant," issued in connection with Japanese Application No. P2015-525648, dated May 10, 2016, 6 pages.

Mexican Patent and Trademark Office, "Office Action," issued in connection with Mexican Application No. MX/a/2014/014741, dated May 13, 2016, 2 pages.

Patent Cooperation Treaty, "International Preliminary Report on Patentability," issued in connection with PCT Application No. PCT/US2013/059497, dated Mar. 31, 2015, 8 pages.

* cited by examiner

METHODS AND APPARATUS FOR SUPPLEMENTING PARTIALLY READABLE AND/OR INACCURATE CODES IN MEDIA

FIELD OF THE DISCLOSURE

This disclosure relates generally to monitoring media, and, more particularly, to methods and apparatus for supplementing partially readable and/or inaccurate codes in media.

BACKGROUND

Media identification systems utilize a variety of techniques to identify media (e.g., television (TV) programs, radio programs, advertisements, commentary, audio/video content, movies, commercials, advertisements, web pages, and/or surveys, etc.). In some media identification systems, a code is inserted into the audio and/or video of a media program. The code is later detected at one or more monitoring sites when the media program is presented. An information payload of a code inserted into media can include unique media identification information, source identification information, time of broadcast information, and/or any other identifying information.

Monitoring sites include locations such as, households, stores, places of business and/or any other public and/or private facilities where monitoring of media exposure and/or consumption of media on media presentation devices is performed. For example, at a monitoring site, a code in audio and/or video is detected and/or a signature is generated from the audio and/or video. The detected code and/or generated signature may then be analyzed and/or sent to a central data collection facility for analysis.

BRIEF DESCRIPTION OF THE DRAWINGS

The figures are not to scale. In general, the same reference numbers will be used throughout the drawing(s) and accompanying written description to refer to the same or like parts, elements, etc.

Figure 1:
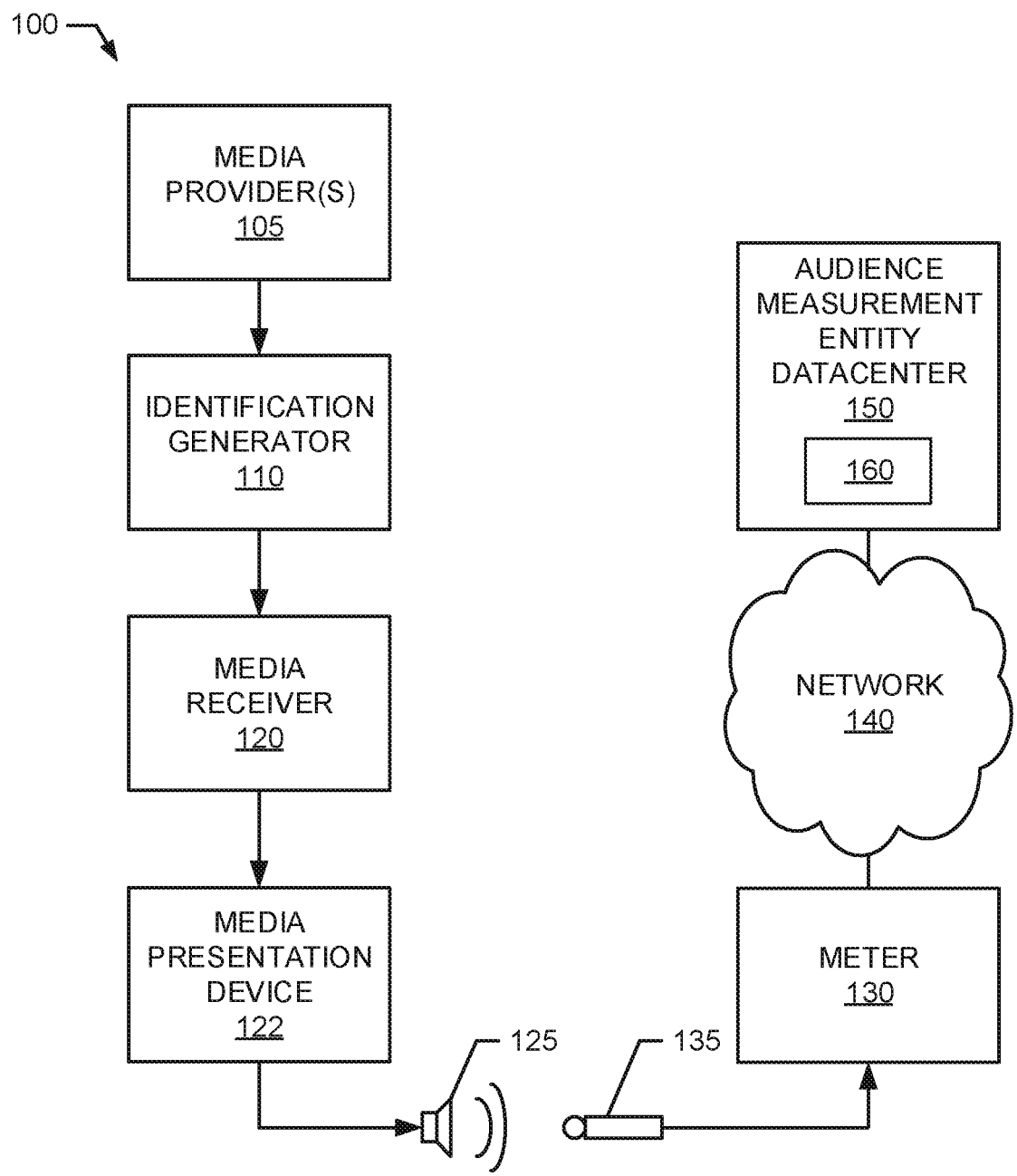
FIG. 1 is a block diagram of an example system for supplementing partially readable and/or inaccurate codes detected in media.

Descriptors "first," "second," "third," etc., are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

When a panelist signs up to have their exposure to media monitored by an audience measurement entity, the audience measurement entity sends a meter (e.g., a media monitor) to the panelist. The meter may be a local meter installed at the home of the panelist, a portable meter that the panelist is to carry, and/or a software application downloaded and/or otherwise installed on a device (e.g., a smartphone, a smart watch, a tablet, etc.) that the panelist is to carry. The meter is capable of gathering media exposure data from one or more media output devices (e.g., a television, a radio, a computer, etc.). In some examples, the meter includes or is otherwise connected to a microphone and/or a magnetic-coupling device to gather ambient audio. In this manner, when the media output device is "on," the microphone may receive an acoustic signal transmitted by the media output device. As further described below, the meter may extract audio watermarks (e.g., codes embedded in audio) from the acoustic signal to identify the media. The meter transmits data related to the watermarks (e.g., a media identifier in the watermark, an encoded timestamp of the watermark, a time of decoding for the watermark, a signal strength of the watermark, etc.) to the audience measurement entity to monitor media exposure.

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to mask the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Audio watermarks may be embedded at a constant rate in an audio signal (e.g., at a rate of one watermark every 4.8 seconds or some other rate). In some instances, when the audio signal is received and decoding or extracted of the watermark is attempted, fewer than all of the watermarks may be detected (e.g., watermarks might only be detected approximately every 30 seconds due to interference, noise, etc.). For example, presented audio that is detected by a microphone and then decoded to obtain watermarks may be susceptible to interference and noise. Furthermore, the payload of a watermark may not be decoded completely. For example, a decoded timestamp (e.g., a decoded timestamp indicating when the media was encoded with the watermark) of a payload may only be partially detectable (e.g., the seconds value of the decoded timestamp may be unreadable and/or inaccurate due to noise and/or due to techniques that stack or combine several watermarks over a period of time to increase detection accuracy).

Examples described herein supplement timestamp data of low confidence watermarks based on decoding timestamps of high confidence watermarks that are consistent with (e.g., match) the low confidence watermarks. A timestamp is made up of multiple data symbols (e.g., values). For example, a timestamp includes data symbols for the hour field, data symbols of the minute field, data symbols for the second field, etc.). As used herein, a low confidence watermark is a watermark that is missing timestamp information (e.g., is partially readable) and/or has a signal strength (e.g., signal-to-noise ratio, received signal strength indicator, etc.) below a threshold (e.g., thereby increasing the likelihood of inaccurate timestamp information) and a high confidence watermark is a watermark that has a signal strength above a threshold with a fully readable timestamp. For example, a low confidence watermark may indicate a source identifier of 1234 and a timestamp of 13:44:--, where the notation -- indicates a portion of the timestamp (e.g., the data symbols corresponding to the seconds portion in this example) that is unknown. As described herein, the partially readable watermark can be supplemented by determining that the watermark is consistent with real-time data and/or one or more high confidence watermarks. Accordingly, even when a watermark is partially detected and/or inaccurate, presented media can be efficiently identified and/or credited. Such efficiency may result in savings of computing resources and computing time for crediting media.

FIG. 1 is a block diagram of an example system 100 that supplements timestamp data of low confidence media watermarks in accordance with teachings of this disclosure. The example system 100 of FIG. 1 includes example media provider(s) 105, an example identification generator 110, an example media receiver 120, an example media presentation device 122, an example speaker 125, an example meter 130, an example microphone 135, an example network 140, and an example audience measurement entity (AME) datacenter 150.

The media provider(s) 105 of FIG. 1 distribute(s) media for broadcast. The media provided by the media provider(s) 105 can be any type of media, such as audio content, video content, multimedia content, advertisements, etc. Additionally, the media can be live media, stored media, time-shiftable media, etc. The media provider 105 of FIG. 1 sends a media signal to the identification generator 110.

The identification generator 110 of FIG. 1 accesses (e.g., obtains, receives, etc.) a media signal from the media provider 105, and generates identifying information associated with the media signal (e.g., a media identifier and/or a timestamp for when the media was generated). The identification generator 110 of the illustrated example inserts (e.g., encodes, embeds, etc.) a watermark (also referred to as a code or identifying code) that includes the identifying information into the media signal to generate a watermarked media signal. In the illustrated example, the identification generator 110 sends (e.g., transmits) the watermarked media signal to the media receiver 120. The media presentation device 122 may output the watermarked media (e.g., including the timestamp) for live broadcast or in time-shifted broadcast (e.g., rewatched using a DVR, played on on-demand, paused and replayed, etc.). Accordingly, the timestamp may or may not reflect the time when the encoded media was output by the media presentation device 122. Rather, the timestamp corresponds to the time that the media was encoded with a code or watermark.

Further examples of watermark encoding techniques that may be implemented by the example identification generator 110 of FIG. 1, and corresponding example watermark detection techniques that may be implemented by the example identification generator 110, are described in U.S. Pat. No. 8,359,205, entitled "Methods and Apparatus to Perform Audio Watermarking and Watermark Detection and Extraction," which issued on Jan. 22, 2013, U.S. Pat. No. 8,369,972, entitled "Methods and Apparatus to Perform Audio Watermarking Detection and Extraction," which issued on Feb. 5, 2013, U.S. Publication No. 2010/0223062, entitled "Methods and Apparatus to Perform Audio Watermarking and Watermark Detection and Extraction," which was published on Sep. 2, 2010, U.S. Pat. No. 6,871,180, entitled "Decoding of Information in Audio Signals," which issued on Mar. 22, 2005, U.S. Pat. No. 5,764,763, entitled "Apparatus and Methods for Including Codes in Audio Signals and Decoding," which issued on Jun. 9, 1998, U.S. Pat. No. 5,574,962, entitled "Method and Apparatus for Automatically Identifying a Program Including a Sound Signal," which issued on Nov. 12, 1996, U.S. Pat. No. 5,581,800, entitled "Method and Apparatus for Automatically Identifying a Program Including a Sound Signal," which issued on Dec. 3, 1996, U.S. Pat. No. 5,787,334, entitled "Method and Apparatus for Automatically Identifying a Program Including a Sound Signal," which issued on Jul. 28, 1998, and U.S. Pat. No. 5,450,490, entitled "Apparatus and Methods for Including Codes in Audio Signals and Decoding," which issued on Sep. 12, 1995, all of which are hereby incorporated by reference in their entireties. U.S. Pat. Nos. 8,359,205, 8,369,972, U.S. Publication No. 2010/0223062, U.S. Pat. Nos. 6,871,180, 5,764,763, 5,574,962, 5,581,800, 5,787,334 and 5,450,490 describe example watermarking systems in which a watermark is included in an audio signal by manipulating a set of frequencies of the audio signal.

The media receiver 120 of FIG. 1 is a device which receives a watermarked media signal from the identification generator 110 and presents and/or records the media signal. For example, the media receiver 120 may send the media signal to the media presentation device 122, which presents an audio portion of the media signal via the speaker 125. In some examples, the media receiver 120 is a customer-premises device, a consumer device, and/or a user device that is located, implemented and/or operated in, for example, a house, an apartment, a place of business, a school, a government office, a medical facility, a church, etc. Example media receivers 120 include, but are not limited to, an internal tuner in a consumer electronic device of any type, a set top box (STB), a digital video recorder (DVR), a video cassette recorder (VCR), a DVD player, a CD player, a personal computer (PC), a game console, a radio, an advertising device, an announcement system, and/or any other type(s) of media player.

The media presentation device 122 of FIG. 1 receives a media signal from the media receiver 120 and presents the media. The example media presentation devices 122 may correspond to, but are not limited to, an audio system, a television, a computer, a mobile device, a tablet, a monitor, and/or any other media presentation system. In some examples, the media receiver 120 of FIG. 1 outputs audio and/or video signals via the media presentation device 122. For instance, a DVD player may display a movie via a screen and speaker(s) of a TV and/or speaker(s) of an audio system.

The speaker 125 of FIG. 1 receives an audio signal from the media presentation device 122 and outputs or otherwise presents the audio signal. The example speakers 125 may correspond to, but are not limited to, an internal speaker in a television, a speaker of an audio system, a speaker connected to a media presentation device 122 via a direct line (e.g., speaker wire, component cables, etc.), and/or a speaker connected to a media presentation device 122 via a wireless connection (e.g., Bluetooth, Wi-Fi network, etc.).

The meter 130 of FIG. 1 receives the audio portion of the media signal via the microphone 135. The meter 130 of the illustrated example determines media identification information from the audio portion of the media signal (e.g., by extracting and/or decoding identifying codes/watermarks) and send the identifying information to the AME datacenter 150 as media monitoring data. The example meter 130 is a device installed in a location of a panelist (e.g., a local people meter) or a device that is carried by the panelist (e.g., a portable people meter and/or a meter implemented in a wearable device, telephone, etc.) that monitors exposure to media from the example media presentative device 122. Panelists are users included in panels maintained by a ratings entity (e.g., the AME datacenter 150) that owns and/or operates the AME datacenter 150. In the illustrated example, the meter 130 detects watermarks in media output by the example media presentation device 122 to identify the media. When detecting a watermark, the example meter 130 may determine a strength of the watermark based on a signal-to-noise ratio, a received signal strength indicator, and/or any other strength determination protocol. The meter 130 may include the strength of the watermark when sending the watermark to the AME datacenter 150. In this manner, the AME datacenter 150 can determine whether a watermark is a high confidence watermark or a low confidence watermark by comparing the strength to a threshold strength (e.g., which is based on user and/or manufacturer preferences, settings, etc.).

In the illustrated example, the meter 130 of FIG. 1 generates a time of decoding and/or extraction (e.g., a decoding and/or extraction timestamp) based on the time that the watermark was extracted and/or decoded. The example AME datacenter 150 utilizes a time of decoding of a high confidence watermark, a decoded timestamp from the high confidence watermark, and a time of decoding of a low confidence watermark to supplement one of more values of a decoded timestamp from the low confidence watermark, as further described below. In the illustrated example, the meter 130 sends the extracted identification information to the AME datacenter 150 as media monitoring data via the network 140. While a single meter 130 is illustrated in FIG. 1, any number and/or variety of the meters 130 may be included in the system 100. In some examples, the meter 130 may be implemented in the media presentation device 122. For example, the media presentation device 122 may be a smart phone or tablet that is outputting the media and the meter 130 may be a software program implemented in the media presentation device 122 to extract watermarks (e.g., via ambient sound and/or by monitoring data corresponding to the media within the media presentation device 122). The example meter 130 of is coupled or otherwise connected to the example microphone 135.

The example microphone 135 of FIG. 1 is a device that receives (e.g., obtains, senses, etc.) ambient audio. In some examples, the example microphone 135 may be magnetic-coupling device (e.g., an induction coupling device, a loop coupling receiver, a telecoil receiver, etc.), and/or any device capable of receiving an audio signal. In such examples, the magnetic-coupling device may receive an audio signal wirelessly rather than acoustically. The example microphone 135 and the example meter 130 may be connected via a wired or wireless connection. In some examples, the example microphone 135 and the example meter 130 may be one device. For example, the example microphone 135 may be embedded in the example meter 130.

The network 140 of FIG. 1 is the Internet. Additionally or alternatively, any other network(s) (e.g., wireless and/or wired network(s)) linking the meter 130 and the AME datacenter 150 may be used. The network 140 may include any number of public and/or private networks using any type(s) of networking protocol(s). The example meter 130 transmits extracted codes and/or watermarks to the example AME datacenter 150 via the example network 140.

The AME datacenter 150 of FIG. 1 receives (e.g., obtains) the watermarks and/or codes including identifying media monitoring information from the meter 130 via the network 140 and identifies the media by comparing the identifying media monitoring information with reference media monitoring information stored in a database. The AME datacenter 150 of FIG. 1 includes the example timestamp supplementer 160. In some examples, the identifying code or watermark may only be partially readable and/or sparsely detected (e.g., have a signal-to-noise ratio (SNR), signal strength (e.g., received signal strength indicator (RSSI), etc., below a threshold). In some examples, the timestamp supplementer 160 tags or otherwise classifies watermarks as high confidence watermarks or low confidence watermarks. The timestamp supplementer 160 classifies watermarks as high confidence when they are fully readable and the strength of the watermark, when decoded by the meter 130, is above a threshold. The timestamp supplementer 160 classifies watermarks as low confidence when they are partially readable or when the strength of the watermark, when decoded by the meter 130, is below a threshold.

The timestamp supplementer 160 of FIG. 1 attempts to identify the missing information (e.g., for a partially readable watermark) and/or inaccurate information (e.g., associated with a low confidence watermark having a low SNR or a low RSSI (e.g., based on a signal strength threshold)) based on other obtained high confidence watermarks (e.g., watermarks that were detected by the meter with a high SNR or a high RSSI (e.g., based on the signal strength threshold)). For example, the readable portion of a low confidence watermark may be missing data symbols corresponding to the seconds data symbol and/or value of the decoded timestamp (e.g. 18:21:--). In such examples, the timestamp supplementer 160 may group watermarks (e.g., based on when they were obtained) and compare the low confidence watermark to other high confidence watermarks in the group to determine if the decoded timestamp of the low confidence watermark statistically matches the decoded timestamps of other high confidence watermarks in the group. In some examples, the decoded timestamp of the low confidence watermark may be compared to real-time data (e.g., live media output) to determine if the watermark statistically matches the time of the live media. When the timestamp supplementer 160 determines that the low confidence watermark matches real-time and/or another watermark(s), the timestamp supplementer 160 adjusts the missing data of the decoded timestamp based on timestamp(s) of the matching high confidence watermark(s) and/or the matching real-time data. In this manner, the timestamp supplementer 160 can use the adjusted decoded timestamp of the low confidence watermark and/or code to credit the media (e.g., as live or time-shifted (e.g., not played live, such as played on-demand, rewatched using a DVR or other media recording device, previously rewound or paused using a DVR or other media recording device, etc.)). Accordingly, the timestamp supplementer 160 can efficiently identify media when a code extracted from the media is not fully recovered, when not all codes are recovered (e.g., each consecutively embedded code is not successfully recovered), when noise allowed the encoded watermark to be extracted with an inaccurate decoded timestamp, etc. The example timestamp supplementer 160 is further described below in conjunction with FIG. 2.

Figure 2:
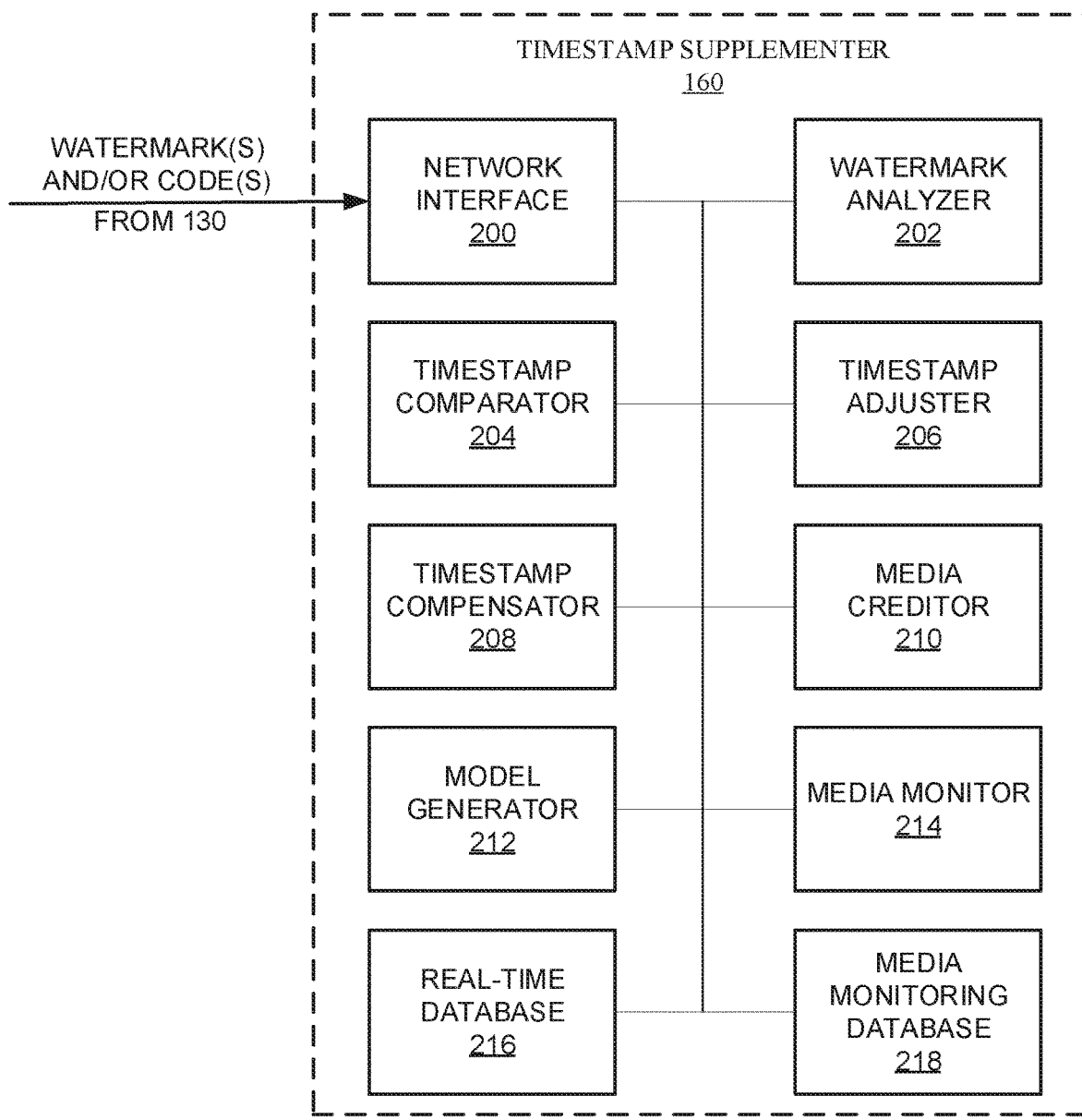
FIG. 2 is an example block diagram of an example timestamp supplementer included in the example system of FIG. 1.

FIG. 2 is a block diagram of an example implementation of the timestamp supplementer 160 of FIG. 1. The example timestamp supplementer 160 includes an example network interface 200, an example watermark analyzer 202, an example timestamp comparator 204, an example timestamp adjuster 206, an example timestamp compensator 208, an example media creditor 210, an example model generator 212, an example media monitor 214, an example real-time database 216, and an example media monitoring database 218.

The example network interface 200 of FIG. 2 obtains watermark(s) and/or code(s) from the example meter 130 and/or any other meters in communication with the example AME datacenter 150 via the example network 140. The obtained watermark(s) and/or codes were extracted by the example meter 130 and include one or more of a media identification code, a timestamp, a time of decoding by the meter 130, a signal-to-noise ratio, a signal strength indicator, etc. In some examples, the network interface 200 can tag a watermark with a time of reception corresponding to when the watermark was received and use the time of reception instead of and/or with the time of decoding. As described above, if the watermark and/or code is low confidence, there is information (e.g., data symbols and/or value(s)) missing from the decoded timestamp of the code and/or watermark and/or there was significant noise to cause the signal to be weak when the watermark was decoded (e.g., correlating to potentially inaccurate timestamp data).

The example watermark analyzer 202 of FIG. 2 analyzes the obtained watermark to determine which watermarks are low confidence and which watermarks are high confidence. The watermark analyzer 202 determines a watermark is low confidence when the watermark is missing decoded timestamp information, has inaccurate decoded timestamp information (e.g., includes a data symbol and/or a value for seconds that is not between 0 and 60, has an invalided year, etc.), and/or has a strength, when decoded, below a threshold. The watermark analyzer 202 determines a watermark is high confidence when the watermark includes decoded timestamp information that is complete, has accurate decoded timestamp information, and/or has a strength, when decoded, above a threshold (e.g., the same as or different than the threshold for the low confidence watermark).

In some examples, the watermark analyzer 202 of FIG. 2 groups two or more watermark(s) together. In some examples, the watermark analyzer 202 groups watermarks together based on when they were obtained (e.g., watermarks obtained within a duration of time are grouped). In some examples, the meter 130 may extract different watermarks from different frequency bands in the frequency spectrum of the media signal. In such example, the watermark analyzer 202 may group watermarks that occur at the same time but at different frequency bands. Watermarks may be encoded and/or decoded using different watermark encoding and/or decoding protocols (e.g., Nielsen audio encoding system (NAES) 2, NAES6, also known as Nielsen watermark (NW), critical band encoding technology (CBET), etc.). The meter 130 may be structured to extract watermarks corresponding to more than one protocol. Accordingly, the watermark analyzer 202 may group watermarks from different watermarking protocols together. In this manner, the example timestamp supplementer 160 can use decoded timestamp information from a high confidence watermark of one protocol to supplement a low confidence watermark of another protocol. In some examples, the watermark analyzer 202 selects a high confidence watermark from a group to compare with a low confidence watermark of the group in order to supplement the missing decoded timestamp information. The example watermark analyzer 202 may select the most reliable high confidence watermark of the group based on signal-to-noise ratio (SNR), signal strength, etc. that may be included with the watermark. In some examples, the watermark analyzer 202 may select two or more readable high confidence watermarks from the group (e.g., based on SNR, signal strength, etc.) to generate a decoded timestamp model and compare decoded timestamp information from any watermark in the group (e.g., low confidence and/or high confidence) to the model to determine if any decoded timestamp information needs to be adjusted or supplemented.

The example timestamp comparator 204 of FIG. 2 compares the decoded timestamp information of a low confidence watermark to (A) real-time or live timestamp data (stored in the example real-time database 216), (B) decoded timestamp information of a high confidence watermark in the group, and/or (C) an decoded timestamp model representative of one or more high confidence watermarks in the group. For example, if a low confidence watermark includes a data symbol and/or a value for a date, a data symbol and/or a value for an hour, a data symbol and/or a value for a minute, but is missing a data symbol and/or a value for a second, the timestamp comparator 204 may compare the watermark to the time corresponding to live media to identify a match (e.g., more than a threshold number of data symbols and/or values of the decoded timestamps matching the real-time data).

In another example, if the low confidence watermark includes a data symbol and/or a value for a date, a data symbol and/or a value for an hour, a data symbol and/or a value for a minute, but is missing a data symbol and/or a value for a second, the timestamp comparator 204 of FIG. 2 may compare the known data symbols and/or values of the low confidence decoded timestamp to data symbols and/or values of a high confidence watermark. In this manner, if there is a match, the timestamp adjuster 206 can fill in the missing decoded timestamp information based on the match. For example, the timestamp comparator 204 may determine that a low confidence watermark has a partial decoded timestamp of 18:21:-- that matches a high confidence decoded timestamp of 18:22:30 obtained one minute after the low confidence watermark (e.g., the time of decoding of the low confidence watermark is one minute before the time of decoding of the high confidence watermark). In such an example, timestamp adjuster 206 may fill in the missing seconds information of the timestamp of the low confidence watermark to yield a resulting adjusted timestamp of 18:21:30, because the low confidence watermark was obtained (e.g., extracted by the meter 130 or obtained at the network interface 200) one minute before the high confidence watermark. However, the example timestamp comparator 204 may determine that a partial timestamp of 18:21:-- does not match a high confidence timestamp of 18:25:30, when the low confidence watermark was extracted by the meter 130 two minutes before the high confidence watermark (e.g., because the decoded timestamp of the high confidence watermark is at least 3 minutes after the decoded timestamp of the low confidence watermark).

In another example, the timestamp comparator 204 of FIG. 2 may compare the timestamp of a low confidence watermark to a timestamp model generated by the example model generator 212. As further described below, the model is based on one or more high confidence watermarks in a group. The model relates values of decoded timestamp(s) of the one or more high confidence watermarks in the group to the time of decoding of the decoded timestamp(s) by the meter 130. For example, if there are three high confidence watermarks in a group, each with a difference of fifteen seconds between their decoded timestamps and their respective times of decoding, the timestamp model may define a relationship in which there is a fifteen second difference between an decoded timestamp and a time of decoding. In such an example, if the timestamp comparator 204 obtains a low confidence timestamp with one symbol (e.g., corresponding to date, hour, minute, seconds, etc.) that is missing or inconsistent with the threshold model, but the rest of the symbols consistent with a fifteen second difference between the decoded timestamp and the time of decoding, the example timestamp comparator 204 may determine that the low confidence timestamp is consistent with the model and the timestamp adjuster 206 may supplement the missing data consistent with the data (e.g., so that the decoded timestamp is fifteen seconds apart from the time of decoding).

The example timestamp adjuster 206 of FIG. 2 adjusts and/or supplements values of a decoded timestamp of a low confidence watermark based on the comparison of the timestamp comparator 204. For example, if the timestamp comparator 204 determines that the decoded timestamp is consistent with real-time media (e.g., when the more than a threshold amount of the data in the decoded timestamp matches data corresponding to the real-time media), the timestamp adjuster 206 adjust missing and/or inaccurate values of the decoded timestamp to be slightly less than (e.g., less than 20 seconds) or equal to the time of decoding for the low confidence watermark. In another example, if the timestamp comparator 204 determines that the decoded timestamp is consistent with a high confidence watermark in the group, the timestamp adjuster 206 adjusts the missing and/or inaccurate values of the decoded timestamp based on the time of decoding of the high confidence watermark, the time of decoding of the low confidence watermark, and the decoded timestamp of the high confidence watermark. The timestamp adjuster 206 adjusts the missing and/or inaccurate values of the decoded timestamp by applying the difference between the decoded timestamp of the high confidence watermark and the decoded timestamp of the low confidence watermark to the decoded timestamp of the high confidence watermark to infer the decoded timestamp of the low confidence watermark. For example, if the decoded timestamp of the high confidence watermark is 7:31:25, the time of decoding of the high confidence watermark is 7:41:25 (e.g., 10 minutes after the decoded timestamp), the time of decoding of the low confidence watermark is 7:11:25, and the decoded timestamp of the low confidence watermark is detected as 7:--:25 (thus, the minutes portion of the timestamp is missing), the timestamp adjuster 206 supplements the minutes of the decoded timestamp of the low confidence watermark to be 7:01:25 (e.g., 10 minutes before the time of decoding the decoded timestamp to match the pattern of the high confidence watermark).

The example timestamp compensator 208 of FIG. 2 compensates decoded timestamps from watermarks based on the time of decoding of the watermarks during comparisons. For example, if the timestamp comparator 204 is comparing a low confidence watermark to a high confidence watermark and the high confidence watermark was obtained twelve minutes after the low confidence watermark, the timestamp compensator 208 can adjust the decoded timestamp from the low confidence watermark and/or the high confidence watermark so that the decoded timestamps are compared with respect to the same time.

The example media creditor 210 of FIG. 2 credits media based on a media identifier and the decoded timestamp from a watermark. In some examples, the media creditor 210 may credit the media as output in real-time or as time shifted based on a comparison of the decoded timestamp from a watermark to the time of decoding of the watermark. For example, if the decoded timestamp is within a threshold duration (e.g., 30 seconds) of the time of decoding, the media creditor 210 may credit the media as real-time and, if the decoded timestamp is outside the threshold duration of the time of decoding, the media creditor 210 may credit the media as time shifted.

The example model generator 212 of FIG. 2 generates a timestamp model based on one or more of the high confidence watermarks in a group. For example, the model generator 212 may select the most reliable one or more watermarks in a group to generate the timestamp model. The most reliable one or more watermarks can be based on signal strength using SNR, RSSI, etc. After the model generator 212 selects the one or more high confidence watermarks, the model generator 212 generates the timestamp model based on the difference between the decoded timestamp and the respective time of decoding for the one or more watermarks (e.g., which should be substantially equal). In some examples, if there are multiple high confidence watermarks, the model generator 212 may select one or more high confidence watermarks that have time of decoding that are close together to reduce the probability that the two watermarks were time shifted between the respective times of decoding. After the model is generated, the example timestamp adjuster 206 can adjust inaccurate or missing decoded timestamps from low confidence based on the timestamp model (e.g., the difference between the decoded timestamp(s) and the respective time(s) of decoding for the one or more high confidence watermarks).

The media monitor 214 of FIG. 2 stores the matching media monitoring information in the media monitoring database 218. The example media monitor 214 generates reports based on the media monitoring information. For example, the media monitor 214 may report the number of times that the media has been presented, whether the media was output in real-time or time shafted, etc. Additionally or alternatively, the media monitor 214 may generate any other report(s). The media monitor 214 may store the report in the media monitoring database 218 and/or may transmit the report to an external device and/or server.

The example real-time database 216 of FIG. 2 stores real-time media information. The real-time information may correspond to all the times that the identification generator 110 generated a watermark for any media. In this manner, the example timestamp comparator 204 can compare a timestamp of a low confidence watermark for a particular media to the real-time data corresponding to the particular media to attempt to identify a match between the real-time data and the low confidence watermark to be able to supplement and/or adjust the values of the timestamp in the low confidence watermark.

The media monitoring database 218 of FIG. 2 is a database of media monitoring information stored, for example, on at least one of a database, a hard disk, a storage facility, or a removable media storage device. The media monitoring database 218 receives input from the media monitor 214 to create a database of media monitoring information. For example, the media monitor 214 may track media exposure of statistically selected individuals (panelists) and use the data to produce media exposure statistics.

Figure 3:
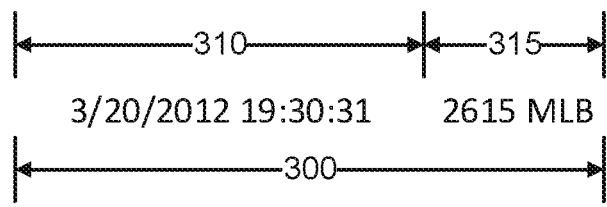
FIGS. 3-6 illustrate example identifying codes, which may be extracted by an example meter included in the example system of FIG. 1.

FIG. 3 illustrates an example identifying code 300 (e.g., watermark) extracted by the meter 130 and sent to the AME datacenter 150 of FIG. 1. The example identifying code 300 includes an example decoded timestamp 310 and example source identification data 315. The decoded timestamp 310 of the identifying code 300, in this example, has been extracted without error and is, thus, complete. The source identification data 315 of the identifying code 300, in this example, has also been extracted without error.

Figure 4:
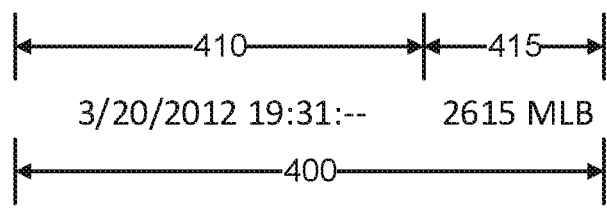

FIG. 4 illustrates another example identifying code 400 (e.g., watermark) extracted by the meter 130 and sent to the AME datacenter 150 of FIG. 1. The example identifying code 400 includes an example decoded timestamp 410 and example source identification data 415. The decoded timestamp 410 of the identifying code 400, in this example, was only partially readable. In the illustrated example, the seconds value of the decoded timestamp 410 is unavailable. The source identification data 415 of the identifying code 400, in this example, has been extracted without error.

Figure 5:
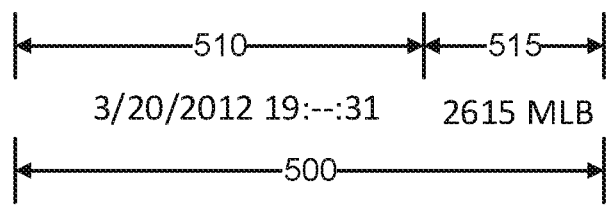

FIG. 5 illustrates yet another example identifying code 500 (e.g., watermark) extracted by the meter 130 and sent to the AME datacenter 150 of FIG. 1. The example identifying code 500 includes an example decoded timestamp 510 and example source identification data 515. The decoded timestamp 510 of the identifying code 500, in this example, was only partially readable. In the illustrated example, the minute value of the decoded timestamp 510 is unavailable. The source identification data 515 of the identifying code 500, in this example, has been extracted without error.

Figure 6:
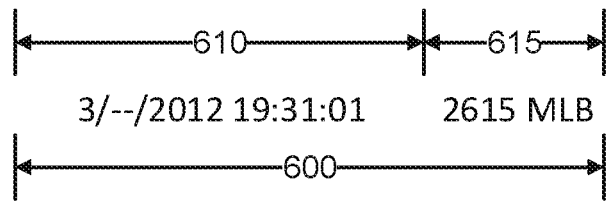

FIG. 6 illustrates yet another example identifying code 600 (e.g., watermark) extracted by the meter 130 and sent to the AME datacenter 150 of FIG. 1. The example identifying code 600 includes an example decoded timestamp 610 and example source identification data 615. The decoded timestamp 610 of the identifying code 600, in this example, was only partially readable. In the illustrated example, the day-of-the-month value of the decoded timestamp 610 is unavailable. The source identification data 615 of the identifying code 600, in this example, has been extracted without error.

While an example manner of implementing the timestamp supplementer 160 of FIG. 1 is illustrated in FIG. 2, one or more of the elements, processes and/or devices illustrated in FIG. 2 may be combined, divided, re-arranged, omitted, eliminated and/or implemented in any other way. Further, the example network interface 200, the example watermark analyzer 202, the example timestamp comparator 204, the example timestamp adjuster 206, the example timestamp compensator 208, the example media creditor 210, the example model generator 212, the example media monitor 214, the example real-time database 216, the example media monitoring database 218, and/or, more generally, the example timestamp supplementer 160 of FIG. 2 may be implemented by hardware, software, firmware and/or any combination of hardware, software and/or firmware. Thus, for example, any of the example network interface 200, the example watermark analyzer 202, the example timestamp comparator 204, the example timestamp adjuster 206, the example timestamp compensator 208, the example media creditor 210, the example model generator 212, the example media monitor 214, the example real-time database 216, the example media monitoring database 218 and/or, more generally, the example timestamp supplementer 160 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 200, the example watermark analyzer 202, the example timestamp comparator 204, the example timestamp adjuster 206, the example timestamp compensator 208, the example media creditor 210, the example model generator 212, the example media monitor 214, the example real-time database 216, the example media monitoring database 218 is/are hereby expressly defined to include a non-transitory computer readable storage device or storage disk such as a memory, a digital versatile disk (DVD), a compact disk (CD), a Blu-ray disk, etc. including the software and/or firmware. Further still, the example timestamp supplementer 160 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
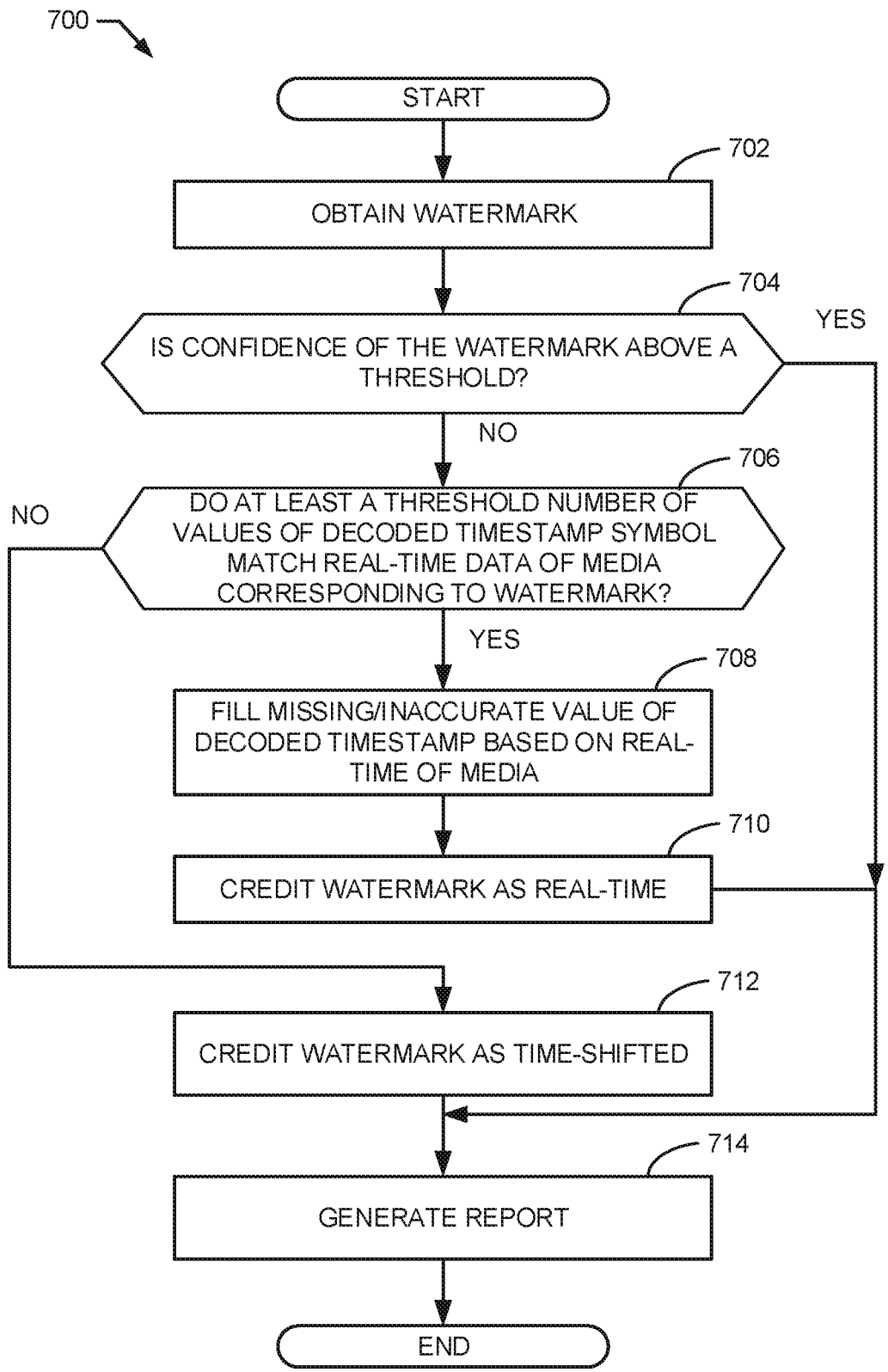
FIG. 7-9 are flowcharts representative of example machine readable instructions that may be executed to implement the example timestamp supplementer of FIGS. 1 and/or 2.
Figure 8:
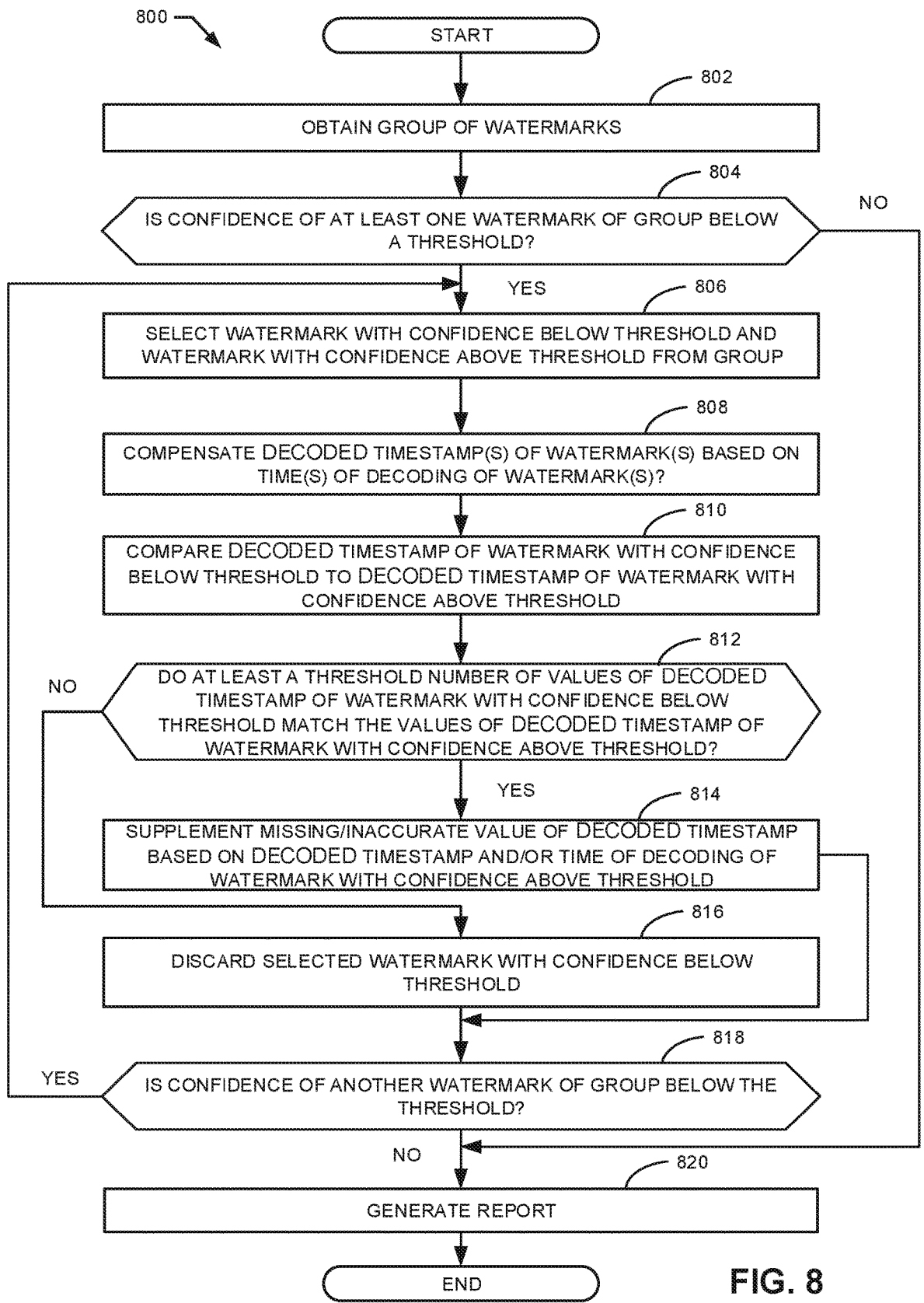
Figure 9:
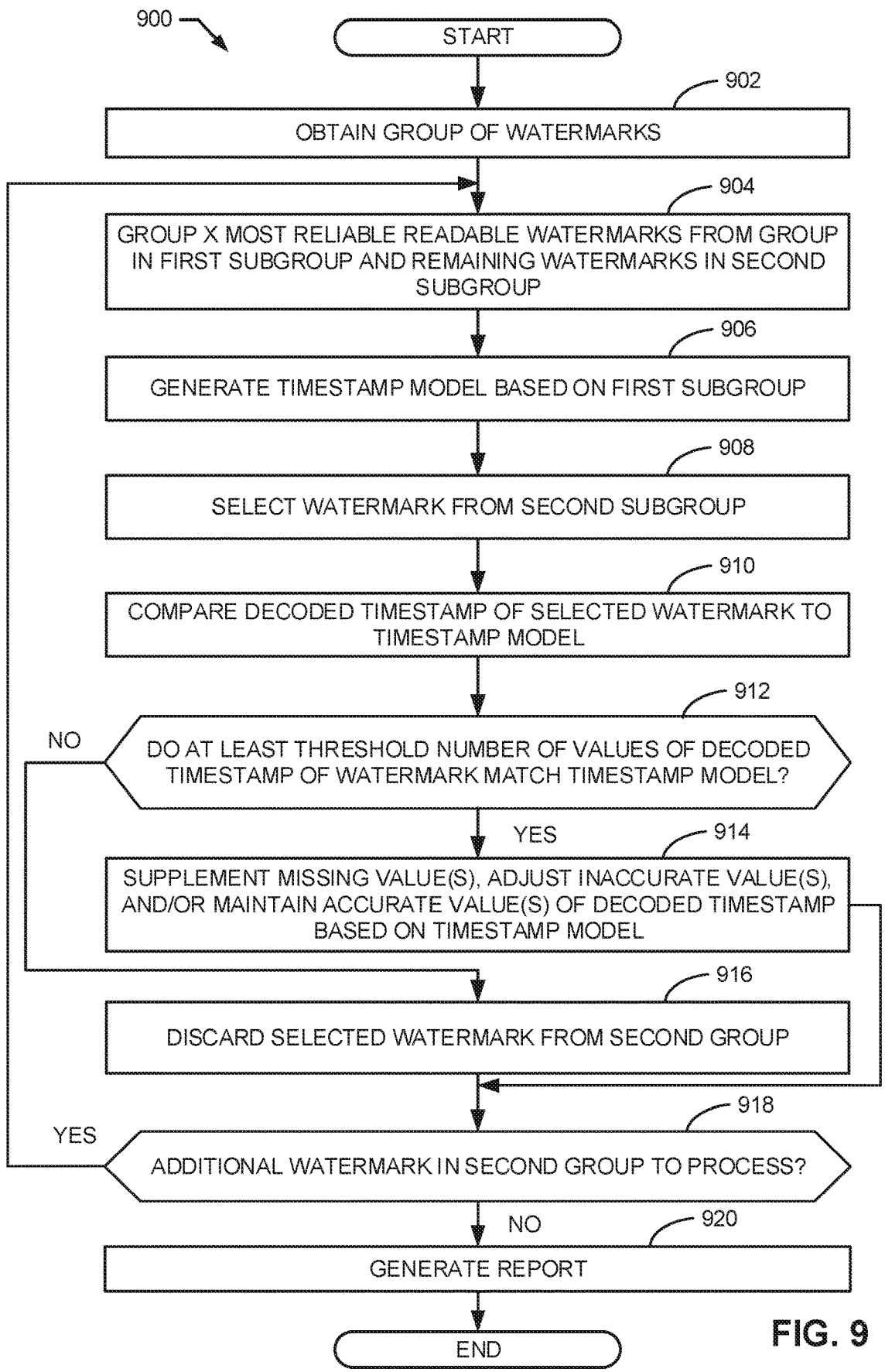

Flowcharts representative of example hardware logic, machine readable instructions, hardware implemented state machines, and/or any combination thereof for implementing the timestamp supplementer 160 of FIG. 2 are shown in FIGS. 7-9. The machine readable instructions may be one or more executable programs or portion(s) of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIGS. 7-9, many other methods of implementing the example timestamp supplementer 160 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 7-9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 7 is an example flowchart representative of example machine readable instructions 700 that may be executed by the example timestamp supplementer 160 of FIGS. 1 and 2 to adjust and/or supplement timestamps for low confidence watermarks based on real-time data. Although the instructions of FIG. 7 are described in conjunction with the example timestamp supplementer 160 of FIGS. 1 and 2, the example instructions may be utilized by any type of timestamp supplementer and/or any type of AME.

At block 702, the example network interface 200 obtains a watermark. As described above, the watermark has been extracted by a meter (e.g., the example meter 130 of FIG. 1) and includes a media identifier and embedded timestamp. The meter may additionally transmit a strength of the watermark and a time of decoding with the watermark. At block 704, the example watermark analyzer 202 determines if the confidence of the watermark is above a confidence threshold (e.g., thereby defining whether the watermark is high confidence or low confidence). For example, the watermark analyzer 202 may base the confidence on signal strength and compare the SNR, RSSI, etc. of the watermark to a respective threshold value.

If the example watermark analyzer 202 determines that the confidence of the watermark is above a threshold (block 704: YES), control continues to block 714, as further described below. If the example watermark analyzer 202 determines that the confidence of the watermark is not above a threshold (block 704: NO), the example timestamp comparator 204 determines if at least a threshold number of values of the detected timestamp match corresponding symbols of the match real-time data of media corresponding to the watermark (block 706). For example, the timestamp comparator 204 compares the timestamp of the low confidence watermark to timing data in the real-time database 216 of the same media (e.g., based on the media identifier of the watermark). As described above, the real-time database 216 stores data corresponding to when the watermarks were encoded. The values may correspond to minutes, hours, seconds, day, month, year, etc. The threshold number of values that need to match (e.g., if the threshold value is 3 and there are 4 values, 3 out of 4 values need to match) may be based on user and/or manufacturer preferences, settings, etc. In some examples, the timestamp comparator 204 determines a match when a threshold number of the values of the decoded timestamp symbol match the real-time of the media corresponding to the watermark when the threshold number of values are within a threshold amount of time from the real-time media data (e.g., 30 seconds, 1 minute, etc.). For example, if 3 out of the 4 values of an decoded timestamp symbol match real-time media corresponding to the watermark within a minute (e.g., the timestamp symbol is 7:--:31 and the real-time media data corresponds to a timestamp of 7:--:38), the timestamp comparator 204 determines a match since the values match within a minute.

If the example timestamp comparator 204 determines that at least a threshold number of values of the decoded timestamp symbol match real-time data of media corresponding to the watermark (block 706: YES), the example timestamp adjuster 206 fills in (e.g., supplements) the missing and/or inaccurate value(s) of the decoded timestamp of the low confidence watermark based on the matching real-time data of the media (e.g., using the corresponding values of the real-time data) (block 708). At block 710, the example media creditor 210 credits the watermark as media exposure to real-time media in conjunction with the media identifier. If the example timestamp comparator 204 determines that at least the threshold number of values of the decoded timestamp symbol do not match real-time data of media corresponding to the watermark (block 706: NO), the example media creditor 210 credits the watermark as media exposure to time-shifted media in conjunction with the media identifier (bock 712). At block 714, the example media monitor 214 generates a report corresponding to the watermark with the adjusted timestamp and/or whether or not the media corresponding to the watermark corresponds to real-time media or time-shifted media. The example media monitor 214 may store the report in the example media monitoring database 218 and/or transmit to another device and/or server (e.g., for reporting and/or for further processing).

FIG. 8 is an example flowchart representative of example machine readable instructions 800 that may be executed by the example timestamp supplementer 160 of FIGS. 1 and 2 to adjust and/or supplement timestamps for low confidence watermarks based on high confidence watermarks. Although the instructions of FIG. 8 are described in conjunction with the example timestamp supplementer 160 of FIGS. 1 and 2, the example instructions may be utilized by any type of timestamp supplementer and/or any type of AME.

At block 802, the example network interface 200 obtains a group of watermarks. As described above, the watermarks has been extracted by one or more meters (e.g., the example meter 130 of FIG. 1) and includes a media identifier and embedded timestamp. The meters may additionally transmit strength(s) of the watermark(s) and a time(s) of decoding with the watermark(s). The example watermark analyzer 202 may obtain a plurality of watermarks and group them based on time of decoding. As described above, the codes may be extracted using the same or different protocols and/or may be extracted at the same time (e.g., at different frequency bands) and/or at different times). At block 804, the example watermark analyzer 202 determines if the confidence of at least one watermark(s) in the group is below a confidence threshold (e.g., thereby defining whether the watermark is high confidence or low confidence). For example, the watermark analyzer 202 may base the confidence on signal strength using SNR, RSSI, etc. of the watermarks to compare to a respective threshold value.

If the example watermark analyzer 202 determines that the confidence of at least one watermark of the group is not below a threshold (block 804: NO), control continues to block 820, as further described below. If the example watermark analyzer 202 determines that the confidence of at least one watermark of the group is below a threshold (block 804: YES), the example watermark analyzer 202 selects a watermark with the confidence below the threshold (e.g., a low confidence watermark) and a watermark with a confidence above the threshold (e.g., a high confidence watermark) from the group (block 806). At block 808, the example timestamp compensator 208 compensates the decoded timestamp from one or both of the watermarks based on the time of decoding of the watermarks. For example, if the high confidence watermark was obtained one minute before the low confidence watermark, the example timestamp compensator 208 may increase the decoded timestamp of the high confident watermark by one minute or may decrease the decoded timestamp of the low confidence watermark so that they should be the same/similar if they match.

At block 810, the example timestamp comparator 204 compares the decoded time stamp from the watermark with the confidence below the threshold to the decoded timestamp from the watermark with the confidence above the threshold (e.g., after timestamp compensation). At block 812, the example timestamp comparator 204 determines if at least a threshold number of values of the decoded timestamp symbol match the values of the decoded timestamp from the watermark with the confidence above the threshold (block 812). In some examples, the timestamp comparator 204 determines a match when the threshold number values of the decoded timestamp symbol from the low confidence watermark match the values of the decoded timestamp symbol from the high confidence watermark within a threshold amount of time (e.g., 30 seconds, 1 minute, etc.).

If the example timestamp comparator 204 determines that at least the threshold number of values of the decoded timestamp symbol match the threshold number of values of the decoded timestamp from the watermark with the confidence above the threshold (block 812: YES), the example timestamp adjuster 206 fills in (e.g., supplements) the missing and/or inaccurate value of the decoded timestamp of the low confidence watermark based on the decoded timestamp of the high confidence watermark and/or the time of decoding of the watermark with the confidence above the threshold (e.g., the high confidence watermark) (block 814). For example, the timestamp adjuster 206 may determine a difference between the decoded timestamp of the high confidence watermark and the time of decoding (e.g., time of extraction) of the high confidence watermark (e.g., 2 minutes) and apply the difference to the time of decoding of the low confidence watermark (e.g., moving the time of decoding back 2 minutes) to generate an decoded timestamp estimate. In such an example, the decoded timestamp estimate is used to supplement missing values of the decoded timestamp of the low confidence watermark and/or adjust inaccurate values (e.g., value that do not match the decoded timestamp estimate) of the low confidence watermark.

If the example timestamp comparator 204 determines that at least the threshold number of values of the decoded timestamp symbol do not match the values of the decoded timestamp from the watermark with the confidence above the threshold (block 812: NO), the example timestamp adjuster 206 discards the selected watermark with the confidence below the threshold (block 816). In some examples, when the decoded timestamp from the low confidence watermark does not match the decoded timestamp from the high confidence watermark, the example timestamp compensator 208 may attempt to match the low confidence watermark with a different high confidence watermark of the group.

At block 818, the example watermark analyzer 202 determines if the confidence of any other watermark in the group is below the threshold (e.g., if there is another low confidence watermark in the group). If the example watermark analyzer 202 determines that there is another low confidence watermark in the group (block 818: YES), control returns to block 806 to attempt to supplement the timestamp of the low confidence watermark. If the example watermark analyzer 202 determines that there is not another low confidence watermark in the group (block 818: NO), the example media monitor 820 generates a report corresponding to the watermark with the adjusted timestamp and/or whether. The example media monitor 214 may store the report in the example media monitoring database 218 and/or transmit to another device and/or server (e.g., for reporting and/or for further processing). In some examples, the media creditor 210 determines whether the media corresponding to one or more watermarks in the group is time shifted and/or real-time by comparing the decoded timestamp of a particular watermark to the time of decoding (e.g., if the decoded timestamp is within a threshold duration of time from the time of decoding, the media creditor 210 credits the media as real-time). In such examples, the media monitor 214 may include the crediting in the report.

FIG. 9 is an example flowchart representative of example machine readable instructions 900 that may be executed by the example timestamp supplementer 160 of FIGS. 1 and 2 to adjust and/or supplement timestamps for low confidence watermarks based on high confidence watermarks. Although the instructions of FIG. 9 are described in conjunction with the example timestamp supplementer 160 of FIGS. 1 and 2, the example instructions may be utilized by any type of timestamp supplementer and/or any type of AME.

At block 902, the example network interface 200 obtains a group of watermarks. As described above, the watermarks has been extracted by one or more meters (e.g., the example meter 130 of FIG. 1) and includes a media identifier and embedded timestamp. The meters may additionally transmit strength(s) of the watermark(s) and a time(s) of decoding with the watermark(s). The example watermark analyzer 202 may obtain a plurality of watermarks and group them based on time of decoding. As described above, the codes may be extracted using the same or different protocols and/or may be extracted at the same time (e.g., at different frequency bands) and/or at different times). At block 904, the example watermark analyzer 202 groups the X most reliable (e.g., highest confidence) watermarks from the group into a first subgroup and the remaining watermarks into a second subgroup. The example watermark analyzer 202 selects the reliable watermarks based on the SNR, RSSI, etc. of the watermarks. The number of watermarks, X, may be based on user and/or manufacturer preferences.

At block 906, the example model generator 212 generates a decoded timestamp model based on the watermark(s) in the first subgroup. The model reflects the difference between the decoded timestamp(s) and the time(s) of decoding for the respective watermark(s) and/or the range of differences between the decoded watermark(s) and the time(s) of decoding. At block 908, the example timestamp comparator 204 selects a watermark from the second subgroup. At block 910, the example timestamp comparator 204 compares the decoded timestamp from the selected watermark with the time of decoding for the selected watermark to the timestamp model. At block 912, the example timestamp comparator 204 determines if more than a threshold number of values of the decoded timestamp symbol when compared to the time of deployment match the timestamp model. For example, if the decoded timestamp of a low confidence watermark is 7:30:--, the time of decoding of the low confidence watermark is 7:40:53, and the threshold model indicates that the X most reliable watermarks in the group have a 9-11 minute difference between the decoding timestamp and the time of decoding, then the timestamp comparator 204 will determine that the decoded timestamp matches the timestamp model because the decoded timestamp is between 9-11 minutes from the time of deployment of the low confidence watermark.

If the example timestamp comparator 204 determines that at least the threshold number of values of the decoded timestamp symbol when compared to the time of deployment match the timestamp model (block 912: YES), the example timestamp adjuster 206 supplements missing value(s) (e.g., for a partially readable watermark), adjusts inaccurate value(s) (e.g., for an inaccurate watermark), and/or maintains accurate value(s) (e.g., for an accurate watermark) of the decoded timestamp based on the timestamp model (block 914). If the example timestamp comparator 204 determines that at least the threshold number of values of the decoded timestamp symbol when compared to the time of deployment do not match the timestamp model (block 912: NO), the example timestamp adjuster 206 discards the selected watermark from the second group (block 916).

At block 918, the example watermark analyzer 202 determines if there is an additional watermark in the second group to be processed. If the example watermark analyzer 202 determines that there is an additional watermark in the second group to process (block 918: YES), control returns to block 904 to process the additional watermark. If the example watermark analyzer 202 determines that there is not an additional watermark in the second group to process (block 918: NO), the example media monitor 214 generates a report corresponding to the watermarks with the adjusted timestamp (block 920). The example media monitor 214 may store the report in the example media monitoring database 218 and/or transmit to another device and/or server (e.g., for reporting and/or for further processing). In some examples, the media creditor 210 determines whether the media corresponding to one or more watermarks in the group is time shifted and/or real-time by comparing the decoded timestamp of a particular watermark to the time of decoding (e.g., if the decoded timestamp is within a threshold duration of time from the time of decoding, the media creditor 210 credits the media as real-time). In such examples, the media monitor 214 may include the crediting in the report.

Figure 10:
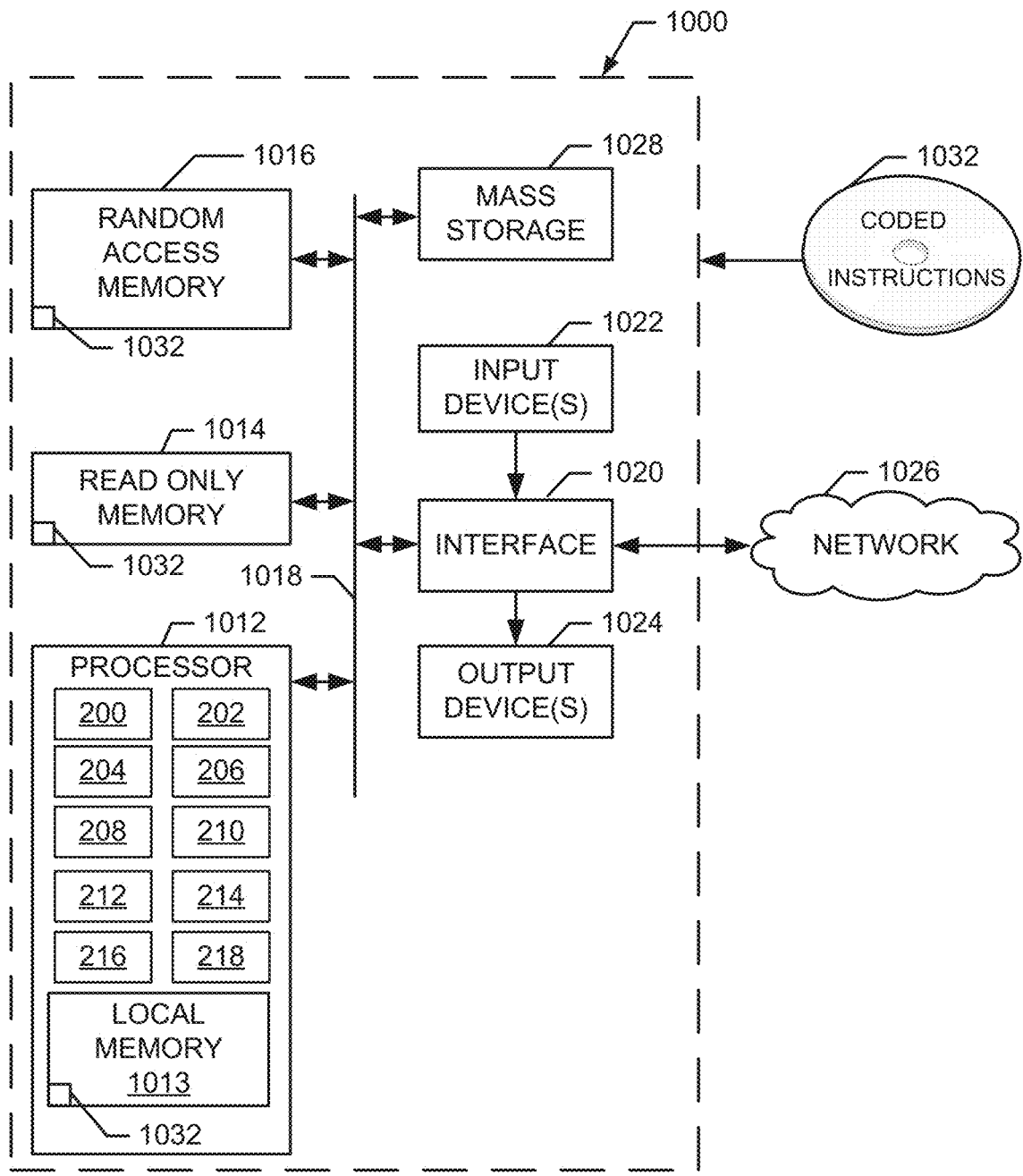
FIG. 10 is a block diagram of an example processing system that may execute the example machine readable instructions of FIGS. 7-9, to implement the example timestamp supplementer of FIGS. 1 and/or 2.

FIG. 10 is a block diagram of an example processor platform 1000 structured to execute the instructions of FIGS. 7-9 to implement the timestamp supplementer 160 of FIG. 2. The processor platform 1000 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example network interface 200, the example watermark analyzer 202, the example timestamp comparator 204, the example timestamp adjuster 206, the example timestamp compensator 208, the example media creditor 210, the example model generator 212, the example media monitor 214, the example real-time database 216, and the example media monitoring database 218.

The processor 1012 of the illustrated example includes a local memory 1013 (e.g., a cache). The processor 1012 of the illustrated example is in communication with a main memory including a read only memory 1014 and a read only memory 1016 via a bus 1018. The read only memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The random access memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 7-9 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that supplement partially readable and/or inaccurate codes. The disclosed methods, apparatus and articles of manufacture improve the efficiency of using a computing device by supplementing missing or inaccurate timestamp data in watermarks, thereby reducing the amount of watermarks that need to be processed to credit media which reduces computing resources. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   an interface to communicate via a network with a plurality of meters to obtain watermarks decoded from media presented by media presentation devices, ones of the meters to monitor the media presented by ones of the media presentation devices and to decode the watermarks from the media:
   a watermark analyzer to select a first watermark and a second watermark from the watermarks decoded from media, the first watermark including a first decoded timestamp associated with a first confidence, the second watermark including a second decoded timestamp associated with a second confidence lower than the first confidence;
   a comparator to compare the first decoded timestamp of the first watermark to the second decoded timestamp of the second watermark;
   a timestamp adjuster to increase the second confidence of the second decoded timestamp by adjusting the second decoded timestamp based on the first decoded timestamp of the first watermark when at least a threshold number of symbols of the second decoded timestamp match corresponding symbols of the first decoded timestamp; and
   a media monitor to:
   generate a report including the adjusted second decoded timestamp; and
   at least one of (a) store the report in a database or (b) transmit the report to an external device.

2. The apparatus of claim 1, wherein to adjust the second decoded timestamp, the timestamp adjuster is to use a first symbol from the first decoded timestamp to supplement a corresponding missing symbol from the second decoded timestamp.

3. The apparatus of claim 1, wherein to adjust the second decoded timestamp, the timestamp adjuster is to use a first symbol from the first decoded timestamp to supplement a corresponding inaccurate symbol from the second decoded timestamp.

4. The apparatus of claim 1, wherein the first watermark is associated with a first strength that is higher than a threshold and the second watermark is associated with a second strength that is lower than the threshold.

5. The apparatus of claim 4, wherein the first strength is at least one of a signal-to-noise ratio or a received signal strength indicator.

6. The apparatus of claim 1, wherein the timestamp adjuster is to adjust the second decoded timestamp by:
   determining a difference between the first decoded timestamp of the first watermark and a time of decoding of the first watermark; and
   applying the difference to the second decoded timestamp of the second watermark to generate a decoded timestamp estimate; and
   at least one of (1) adjusting any symbols of the second decoded timestamp that do not correspond to the decoded timestamp estimate or (2) using a symbol of the decoded timestamp estimate to supplement a corresponding missing symbol of the second decoded timestamp.

7. The apparatus of claim 1, wherein the first watermark was extracted from the media using a first watermark extraction protocol and the second watermark was extracted from the media using a second watermark extraction protocol different than the first watermark extraction protocol.

8. The apparatus of claim 1, wherein the first watermark was extracted from a first frequency band of the media and the second watermark was extracted from a second frequency band of the media, the second frequency band different than the first frequency band.

9. The apparatus of claim 1, wherein:
   the watermark analyzer is to determine the second confidence is a lower than the first confidence based on the second watermark including missing or inaccurate information relative to the first watermark; and
   the timestamp adjuster is to adjust the second decoded timestamp to replace the missing or inaccurate information with corresponding accurate information from the first watermark.

10. A non-transitory computer readable storage medium comprising instructions which, when executed, cause one or more processors to at least:
    communicate via a network with a plurality of meters to obtain watermarks decoded from media presented by media presentation devices, ones of the meters to monitor the media presented by ones of the media presentation devices and to decode the watermarks from the media;
    select a first watermark and a second watermark from the watermarks decoded from media, the first watermark including a first decoded timestamp associated with a first confidence, the second watermark including a second decoded timestamp associated with a second confidence lower than the first confidence;
    compare the first decoded timestamp of the first watermark to the second decoded timestamp of the second watermark;
    increase the second confidence of the second decoded timestamp by adjusting the second decoded timestamp based on the first decoded timestamp of the first watermark when at least a threshold number of symbols of the second decoded timestamp match corresponding symbols of the first decoded timestamp;
    generate a report including the adjusted second decoded timestamp; and
    at least one of (a) store the report in a database or (b) transmit the report to an external device.

11. The computer readable storage medium of claim 10, wherein the instructions cause the one or more processors to adjust the second decoded timestamp by using a first symbol from the first decoded timestamp to supplement a corresponding missing symbol from the second decoded timestamp.

12. The computer readable storage medium of claim 10, wherein the instructions cause the one or more processors to adjust the second decoded timestamp by using a first symbol from the first decoded timestamp to supplement a corresponding inaccurate symbol from the second decoded timestamp.

13. The computer readable storage medium of claim 10, wherein the first watermark is associated with a first strength that is higher than a threshold and the second watermark is associated with a second strength that is lower than the threshold.

14. The computer readable storage medium of claim 13, wherein the first strength is at least one of a signal-to-noise ratio or a received signal strength indicator.

15. The computer readable storage medium of claim 10, wherein the instructions cause the one or more processors to adjust the second decoded timestamp by:
    determining a difference between the first decoded timestamp of the first watermark and a time of decoding of the first watermark; and
    applying the difference to the second decoded timestamp of the second watermark to generate a decoded timestamp estimate; and
    at least one of (1) adjusting any symbols of the second decoded timestamp that do not correspond to the decoded timestamp estimate or (2) using a symbol of the decoded timestamp estimate to supplement a corresponding missing symbol of the second decoded timestamp.

16. The computer readable storage medium of claim 10, wherein the first watermark was extracted from the media using a first watermark extraction protocol and the second watermark was extracted from the media using a second watermark extraction protocol different than the first watermark extraction protocol.

17. The computer readable storage medium of claim 10, wherein the first watermark was extracted from a first frequency band of the media and the second watermark was extracted from a second frequency band of the media, the second frequency band different than the first frequency band.

18. A method comprising:
    communicating, via a network, with a plurality of meters to obtain watermarks decoded from media presented by media presentation devices, ones of the meters to monitor the media presented by ones of the media presentation devices and to decode the watermarks from the media;

determining, by executing an instruction with one or more processors, a first signal strength of a first watermark and a second signal strength of a second watermark, the first watermark and the second watermark included in the watermarks decoded from the media;
when the first signal strength is above a threshold and the second signal strength is below the threshold:
comparing, by executing an instruction with the one or more processors, a first decoded timestamp of the first watermark to a second decoded timestamp of the second watermark; and
increasing, by executing an instruction with the one or more processors, a confidence of the second decoded timestamp by adjusting the second decoded timestamp based on the first decoded timestamp of the first watermark when at least a threshold number of symbols of the second decoded timestamp match corresponding symbols of the first decoded timestamp; and
crediting, by executing an instruction with the one or more processors, exposure to the media based on the adjusted second decoded timestamp.

19. The method of claim 18, wherein the adjusting of the second decoded timestamp includes using a first symbol from the first decoded timestamp to supplement a corresponding missing symbol from the second decoded timestamp.

20. The method of claim 18, wherein the adjusting of the second decoded timestamp includes using a first symbol from the first decoded timestamp to supplement a corresponding inaccurate symbol from the second decoded timestamp.

21. The method of claim 18, wherein the first strength is at least one of a signal-to-noise ratio or a received signal strength indicator.

22. An apparatus comprising:
at least one memory;
instruction in the apparatus; and
processor circuitry to execute the instructions to:
communicate via a network with a plurality of meters to obtain watermarks decoded from media presented by media presentation devices, ones of the meters to monitor the media presented by ones of the media presentation devices and to decode the watermarks from the media;
select a first watermark and a second watermark from the watermarks decoded from media, the first watermark including a first decoded timestamp associated with a first confidence, the second watermark including a second decoded timestamp associated with a second confidence lower than the first confidence;
compare a first decoded timestamp of the first watermark to a second decoded timestamp of the second watermark;
increase a confidence of the second decoded timestamp by modifying the second decoded timestamp using the first decoded timestamp of the first watermark when at least a threshold number of symbols of the second decoded timestamp match corresponding symbols of the first decoded timestamp; and
credit exposure to the media as real-time or time shifted based on the modified second decoded timestamp and a time corresponding to when the second watermark was decoded.

23. The apparatus of claim 22, wherein the processor circuitry is to adjust the second decoded timestamp using a first symbol from the first decoded timestamp to supplement a corresponding missing symbol from the second decoded timestamp.

24. The apparatus of claim 22, wherein the processor circuitry is to adjust the second decoded timestamp using a first symbol from the first decoded timestamp to supplement a corresponding inaccurate symbol from the second decoded timestamp.

25. The apparatus of claim 22, wherein the first watermark is associated with a first strength that is higher than a threshold and the second watermark is associated with a second strength that is lower than the threshold.

26. The apparatus of claim 25, wherein the first strength is at least one of a signal-to-noise ratio or a received signal strength indicator.

27. The apparatus of claim 22, wherein the processor circuitry is to adjust the second decoded timestamp by:
determining a difference between the first decoded timestamp of the first watermark and a time of decoding of the first watermark; and
applying the difference to the second decoded timestamp of the second watermark to generate a decoded timestamp estimate; and
at least one of (1) adjusting any symbols of the second decoded timestamp that do not correspond to the decoded timestamp estimate or (2) using a symbol of the decoded timestamp estimate to supplement a corresponding missing symbol of the second decoded timestamp.

28. The apparatus of claim 22, wherein the first watermark was extracted from the media using a first watermark extraction protocol and the second watermark was extracted from the media using a second watermark extraction protocol different than the first watermark extraction protocol.

29. The apparatus of claim 22, wherein the first watermark was extracted from a first frequency band of the media and the second watermark was extracted from a second frequency band of the media, the second frequency band different than the first frequency band.

* * * * *